T. U. WEBB.
Cultivator.
No. 55,185.                                              Patented May 29, 1866.
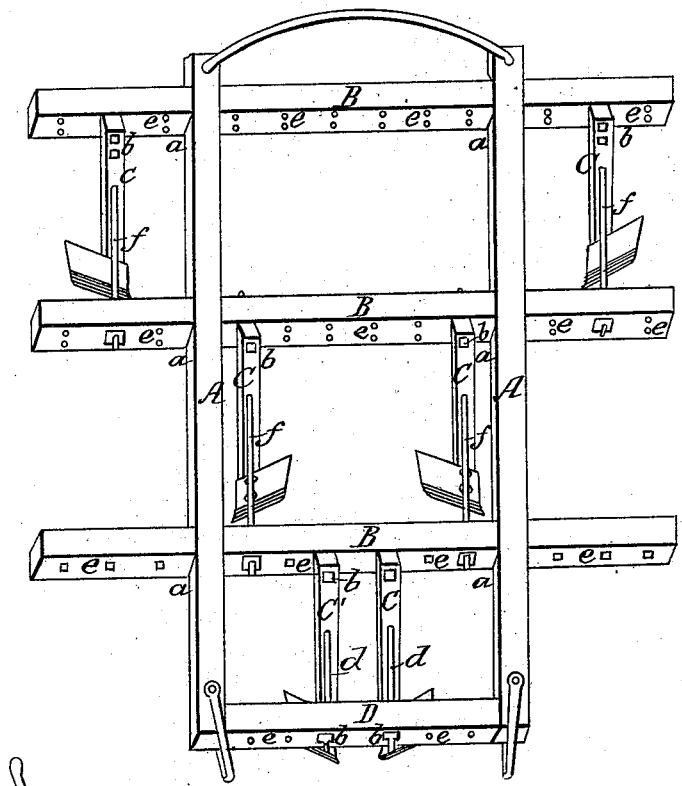
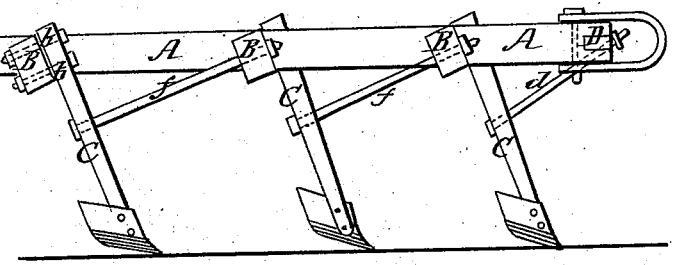
Fig. 2
Witnesses:
W. Jay Kitcham.
B. R. Conklin.
Inventor:
Timothy U. Webb
by his Attys
J. B. Woodruff & Son.

UNITED STATES PATENT OFFICE.

TIMOTHY U. WEBB, OF SPRINGFIELD, ILLINOIS.

IMPROVEMENT IN CULTIVATORS.

Specification forming part of Letters Patent No. 55,185, dated May 29, 1866.

*To all whom it may concern:*

Be it known that I, TIMOTHY U. WEBB, of Springfield, in the county of Sangamon, in the State of Illinois, have invented certain new and useful Improvements in Cultivators for cotton, corn, and every variety of plants in rows—namely, a universal cultivator; and the following is a full, clear, and exact description of the same, reference being had to the accompanying drawings, making a part of this specification, in which—

Figure 1 represents a plan or top view of the frame with the plow or cultivator standards and points and the manner in which they are attached and braced to the angle crosstimbers. Fig. 2 shows a side elevation of the same, the position the cross-timbers are halved onto the parallel draft-timbers, and the mode of securing and bracing the plows.

The object of my invention is to make cultivators which will answer the purpose for cultivating, scraping, weeding, or hilling up all kinds of plants or vegetables that are grown in rows in a cheaper, more substantial, and durable manner than have ever before been made to my knowledge or belief.

My invention consists in so notching or halving straight bars or timbers onto the draft-timbers that the face of the bars or cross-timbers will be the proper angle on which to bolt the straight standards to which the plows or cultivator-points are secured, and also in making a series of holes in the bars or cross-timbers, so that the plows or cultivators may be easily changed in their position to vary the spaces between them relative to the plants of the different kinds and the periods of their growth. The same holes answer the twofold purpose of bolting the standards to the bars and bracing them to the forward bar.

To enable others skilled in the art to make and use my invention, I will proceed to describe it more fully, referring to the drawings and to the letters marked thereon.

I make my universal-cultivator frame of straight hard wood, the timbers being of such width and thickness as necessary for the required strength, the draft-pieces A A being placed parallel with each other, two or three feet (more or less) apart, according to the size and capacity of the implement, they having notches *a a a* cut in them at about equal distances apart, so that the bars or cross-timbers B B B may be halved and fitted into them cornerwise or on such an angle as will be suitable to place the standards C C C at the proper inclination forward to have the plows or cultivator-points work free and easy. The timbers being thus fitted are bolted together at each joint, making a very cheap and substantial frame, a shorter timber, D, being framed into the timbers A A at the forward end, for the purpose of attaching the rods *d d*, to brace the two forward standards, C' C', they being secured to the bar or cross-timber B by bolts and screw-nuts *b b*. The cultivator-standards C C C C are all secured to the cross-bars B B in the same manner, by having square bolts to fit in square holes *e e e e*, or two bolts may be used square next the head and round where they pass through the timber, as shown in the rear bar, B', of both figures in the drawings. All of the cultivators are supported by brace-rods *f f f f* through the standards C C C C, reaching to the cross-timbers B B forward, and passing through the holes *e e*, which are made to bolt the cultivators to the bars, so that by taking out the brace-rods *f f* and the nuts off the bolts *b b* the standards and cultivators can be easily changed in their position, so as to be adapted to all the varieties of plants that are usually cultivated in rows and in all stages of their early growth. For example, corn planted in a rich soil by the time it shows the sprout above ground the weeds have also started. The cultivators can be placed so as to run quite near the row without plowing it up or covering it with dirt. The other plows could follow in the order and position shown in the drawings. By the time the corn would require the second cultivation the two front plows can be reversed and placed at such a position on the bar as to turn the earth toward the plants, and the hilling up can be done to any desired extent by simply changing the position of the cultivators, placing them so as to turn all of the earth toward the row.

In cultivating many kinds of cereals it is only necessary to keep the weeds under, and this can be done effectually by the position the plows are placed. In cultivating sorghum, cotton, potatoes, tomatoes, or any other plants it is only necessary to adjust the plows so as to give such cultivation as the species of the plant requires.

Cultivators constructed on my improved plan can be used with one or two horses, and any desired number of the plows can be used. By removing a part of the plows and placing those left in proper position the implement can be used for laying off plowed ground into furrows for planting.

Thus it will be seen that a universal cultivator and an implement for other agricultural purposes is constructed in the most simple and efficient manner.

The advantages to be derived by my invention are in the simplicity and cheapness of the construction, the lightness and strength of the implement, and its adaptation to all of the various plants and stages of their growth. Any of the changes necessary for the cultivation of the different species of plants can be made in a very few minutes, so that there is not only economy in the cost of the implement, but much economy in the time in using it.

It is an established fact, and getting to be well understood throughout the great fertile regions of the West, that all of the agricultural pursuits have got to be carried on mainly by labor-saving implements and machines; and the more simple and cheap an implement or machine can be constructed, provided it has strength and durability, and the more one article can be made to perform, the more it will be sought after and appreciated by the yeomanry; and in many of the agricultural implements and machines it might seem that a good degree of perfection has been already obtained; but, so far as my knowledge extends and observation of the practical use of cultivators in the West, I am satisfied that there is much room for improvement in that article of husbandry, and that my mode of constructing cultivators as above described will be found to possess more merit as to its practical utility and the efficiency of its operation than any that have been hitherto known and used, and my experience has reached nearly half a century.

I do not claim anything in the principle of adjusting the spaces between the plows or cultivator-points, or reversing them so as to incline the earth in different directions; but,

Having thus fully described my invention, what I claim as new, and desire to secure by Letters Patent, is—

1. The construction of the frame, the timbers A A, and cross bars or timbers B B B, so notched and halved together on an angle that the face of the cross-bars B will place the straight standards C C C C in a proper inclination for supporting and bracing the plows or cultivators, substantially as herein described.

2. Making corresponding series of holes e e through the cross-bars B B B for the purpose of bolting and bracing the cultivator-standards C C C C, so that the cultivators may be changed to work either right or left and the spaces adjusted between them, as and for the purposes herein set forth.

Subscribed to on this 16th day of April, 1866.

TIMOTHY U. WEBB.

Witnesses:
SAML. McCORD,
A. B. GEILFUST.